US011340927B2

(12) United States Patent
Thomas et al.

(10) Patent No.: US 11,340,927 B2
(45) Date of Patent: May 24, 2022

(54) APPLICATION-BASED COMPUTING RESOURCE MANAGEMENT

(71) Applicant: Amazon Technologies, Inc., Seattle, WA (US)

(72) Inventors: Nathan Bartholomew Thomas, Bellevue, WA (US); Sheshadri Supreeth Koushik, Redmond, WA (US); Yang Lin, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 384 days.

(21) Appl. No.: 16/138,846

(22) Filed: Sep. 21, 2018

(65) Prior Publication Data

US 2019/0026145 A1 Jan. 24, 2019

Related U.S. Application Data

(62) Division of application No. 14/981,774, filed on Dec. 28, 2015, now Pat. No. 10,083,054.

(51) Int. Cl.
*G06F 9/455* (2018.01)
*G06F 9/445* (2018.01)
(Continued)

(52) U.S. Cl.
CPC .......... *G06F 9/45558* (2013.01); *G06F 8/61* (2013.01); *G06F 9/44505* (2013.01);
(Continued)

(58) Field of Classification Search
None
See application file for complete search history.

(56) References Cited

U.S. PATENT DOCUMENTS 7,971,182 B1 * 6/2011 Vlaovic .............. G06F 9/44521
717/104
9,043,454 B2 * 5/2015 Elyashev .............. G06F 9/4418
709/224
(Continued)

FOREIGN PATENT DOCUMENTS

CN 101877043 A 11/2010
CN 103493016 A 1/2014

OTHER PUBLICATIONS

Beaty et al., "Desktop to Cloud Transformation Planning," Parallel & Distributed Processing, 2009, IEEE International Symposium on May 23, 2009, 8 pages.
(Continued)

*Primary Examiner* — Bing Zhao
(74) *Attorney, Agent, or Firm* — Davis Wright Tremaine LLP

(57) ABSTRACT

Computing resources are provided to a user by identifying applications used by the user, and provisioning virtual computing resources that are adapted to the resource requirements of the identified applications. The resource requirements of the identified applications can be combined into a single set of resource requirements and used to acquire a virtual machine that is able to host the identified applications. In other examples, virtual machines may be acquired for each identified application. Each virtual machine generates a display stream via a streaming agent. The display stream is received by an application streaming client on the user's client computer system, and is displayed to the user on a client display. Multiple virtual machines may generate multiple display streams which can be combined by the application streaming client and presented to the user on the single client display.

20 Claims, 10 Drawing Sheets

(51) Int. Cl.
  *G06F 9/50* (2006.01)
  *G06F 9/451* (2018.01)
  *G06F 8/61* (2018.01)
  *H04L 65/60* (2022.01)

(52) U.S. Cl.
  CPC ............ *G06F 9/452* (2018.02); *G06F 9/5077* (2013.01); *H04L 65/607* (2013.01); *G06F 2009/4557* (2013.01); *G06F 2009/45562* (2013.01); *G06F 2009/45595* (2013.01)

(56) References Cited

U.S. PATENT DOCUMENTS

| | | | |
|---|---|---|---|
| 9,582,272 B1 * | 2/2017 | Doucette | G06F 9/5044 |
| 2007/0124474 A1 | 5/2007 | Margulis | |
| 2007/0174410 A1 | 7/2007 | Croft et al. | |
| 2011/0131589 A1 | 6/2011 | Beaty et al. | |
| 2012/0084381 A1 | 4/2012 | Alladi et al. | |
| 2012/0284380 A1 | 11/2012 | Anderson, III et al. | |
| 2013/0232497 A1 | 9/2013 | Jalagam et al. | |
| 2014/0258155 A1 | 9/2014 | Suryanarayanan et al. | |
| 2015/0019733 A1 | 1/2015 | Suryanarayanan et al. | |

OTHER PUBLICATIONS

International Search Report and Written Opinion, dated Jun. 23, 2017, International Patent Application No. PCT/US2016/068095, filed Dec. 21, 2016.

Chinese First Office Action dated Oct. 10, 2020, Patent Application No. 2016800768136, 8 pages.

German Office Action dated Nov. 10, 2020, German Patent Application No. 112016006083.1, 8 pages.

Chinese Second Office Action dated Jul. 7, 2021, Patent Application No. 2016800768136, 9 pages.

* cited by examiner

# APPLICATION-BASED COMPUTING RESOURCE MANAGEMENT

CROSS-REFERENCE TO RELATED APPLICATIONS

This application is a divisional of U.S. patent application Ser. No. 14/981,774, filed on Dec. 28, 2015, entitled "APPLICATION-BASED COMPUTING RESOURCE MANAGEMENT," which is incorporated herein by reference for all purposes.

BACKGROUND

In a business environment, many workers require access to computing resources in order to perform their work functions. For example, an administrative assistant may require access to word processing, data processing, and database access functions. An engineer may require computer aided drafting ("CAD") applications and complex simulation software. Some businesses provide computing resources for their workers by acquiring personal computers for each worker. Personal computers may be configured with varying amounts of memory, storage, and processing capabilities. Identifying the appropriate configuration for each worker is a difficult problem. If computing resources are provided to a worker that significantly exceed the computing requirements of the worker, the excess resources may be wasted. If insufficient computing resources are provided to a worker, the worker's ability to perform work functions may be impaired and the computer system may require early replacement or expensive upgrades.

Some businesses have chosen to address these problems by acquiring computing resources from online service providers on demand. An online service provider can provide computing services to workers via thin clients or terminals. While this model provides some level of increased flexibility in adjusting the amount of computing resources provided, it can still be difficult to determine the optimal amount of computing resources to provide to each worker and is nevertheless prone to the issues discussed above, among others.

BRIEF DESCRIPTION OF THE DRAWINGS

Various techniques will be described with reference to the drawings, in which.

DETAILED DESCRIPTION

Figure 1:
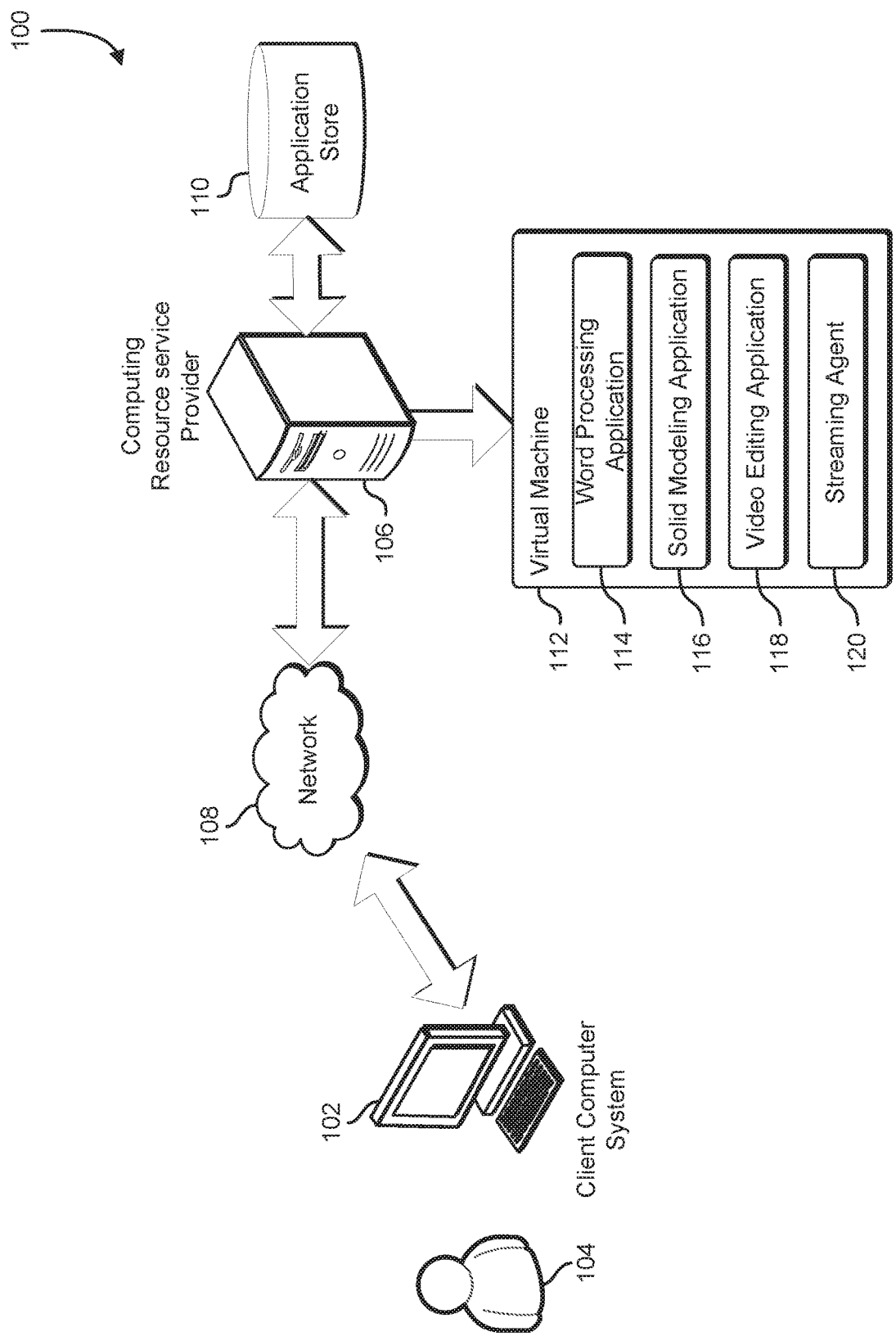
FIG. 1 shows an illustrative example of an environment in which various embodiments may be practiced.

The current document describes providing computing resources to a user by allocating one or more virtual machines ("VMs") to the user, and streaming display information from applications hosted on the virtual machines to an application streaming client running on a client computer system. The characteristics of the virtual machines are determined by identifying a set of applications for use by the user, and allocating an amount of computing resources to the virtual machines which is adapted to hosting the identified set of applications. Each application has an associated set of computing resource requirements that describe the computing resources necessary to host the application. Each set of requirements specifies amounts of various types of computing resources such as disk storage, free memory, video memory, and processor speed.

In some environments, a single virtual machine hosts the identified applications. The sets of requirements for the identified applications are combined into a single set of requirements, and the single set of requirements is used to generate a virtual machine in accordance with the combined requirements that is capable of hosting the identified applications. In another example, the single set of requirements is used to select a resource profile from a set of predefined resource profiles, and the selected resource profile is used to generate the virtual machine for the user. A streaming agent running on the virtual machine encodes display information provided by the hosted applications, and transmits the encoded display information to a client computer system belonging to the user via an application streaming client. The user is able to interact with the virtual machine via the client computer system, and in general, the computing resources provided by the virtual machine can be maintained, upgraded, or modified in response to changing user needs or changing application requirements by an administrator or other party.

The combination of application requirements can be adjusted based on predicted or observed patterns of application usage. For example, the sets of application requirements may be combined in ways that assume that the user does not at run more than one application simultaneously, or that only specified applications may be run simultaneously.

If two applications are run simultaneously, the virtual machine hosting the applications is allocated an amount of memory equal to the sum of the memory requirements for each application. If a number of applications are not run simultaneously, the virtual machine hosting the applications is allocated an amount of memory equal to the maximum amount of memory required by each application. Certain types of computing resources such as disk storage are used whether or not an application is running, therefore, a virtual machine hosting multiple applications is allocated an amount of disk storage equal to the sum of the disk storage requirements of the applications. Processing requirements may be combined using a hybrid approach, since processor requirements for applications tend to be based on maximum processor usage rather than a steady average amount of use. In some examples, a virtual machine hosting multiple applications is allocated an amount of processing resources equal to the maximum amount of processing resources requested by any single application. In another example, a virtual machine hosting multiple applications is allocated an amount of processing resources equal to the maximum amount of processing resources requested by a single application, and an additional amount of processing resources equal to a fraction of the processing resources requested by the remaining applications.

In other environments, multiple virtual machines may be used to host applications for the user. In one implementation, a virtual machine is provisioned for each of the identified applications, and each virtual machine is adapted to the resource requirements of the particular application hosted by the virtual machine. A streaming agent runs on each virtual machine and streams display information from the application hosted by the virtual machine to a client computer system. An application streaming client running on the client computer system includes a stream combiner which receives display streams from each virtual machine, and combines the display streams into a single display which is presented to the user. Virtual machines may be launched in shutdown as applications are opened and closed by the user, and each virtual machine may be allocated computing resources based on the needs of the particular application hosted by the virtual machine.

In yet another environment, multiple users share access to a single virtual machine. The virtual machine hosts an instance of an application that supports multiple simultaneous user sessions. Each session of the application utilizes a separate streaming agent running within the virtual machine. Each streaming agent connects to an application streaming client running on a client computer system that services a user. The streaming agents on the single virtual computer environment may coordinate the encoding of display information by sharing encoded information that is associated with display components such as toolbars, static display regions, or other user interface components that are common across multiple user sessions. Application sessions may share common operational components such as static and dynamic libraries, resource files, and databases.

When a streaming agent encodes display information for transmission to the client computer system, the encoding operation can be optimized in a number of ways. Portions of an application's display screen that are static or do not change frequently may be retained and reused by the streaming agent. If the application streaming client running on the client computer system is application aware, the application streaming client may provide information to the streaming agent indicating that certain portions of the application display stream need not be provided by the streaming agent. In some implementations, a window manager on the client computer system combines one or more display streams provided by one or more streaming agents, and a portion of one or more display streams may be obscured on the client display. The window manager provides viewport information to the streaming agent that identifies portions of the display stream that are not visible on the client, and therefore need not be encoded or transmitted.

Applications for use by the user may be identified manually by the user or an administrator, or automatically by monitoring the user's application use with an agent running on the client computer system. For example, computing resources may be provisioned and provided to a user that allows all applications to be executed. Actual usage of the applications is monitored by an agent, and after a period of time, the information acquired by the agent is used to identify applications that are available to the user, but are unused. The unused applications are removed from the user's profile, and a reduced amount of computing resources is allocated to the user's virtual machine based on the particular applications actually used. In another example, a set of applications is provided to the user and an agent identifies when more than one application is used simultaneously. As a result of simultaneous application use being detected, the computing resource requirements for the user are recalculated in accordance with simultaneous application use, and appropriate increased computing resources are allocated to the user's virtual machine.

Computing resources can be adjusted based at least in part on a budget assigned to the user. In general, users are provided with virtual machines configured to provide optimal performance for the applications identified for use by the user. As computing resources are used, a budget associated with the user is appropriated by the computing resource service provider. As the budget is consumed, the computing resource service provider determines whether the remaining budget will be exhausted prior to the expiration of the budget term. If the remaining budget will be exhausted prior to the expiration of the budget term, the computing resource service provider rations the computing resources allocated to the user's virtual machine to ensure that the budget lasts until the expiration of the budget term. When adjustments are made based on budget limitations, notification may be sent to the user and an administrator requesting an increase in the computing resource budget.

FIG. 1 shows an illustrative example of an environment in which various embodiments may be practiced. An environment 100 includes a client computer system 102 that is used by a user 104 to access a computing resource service provider 106 via a computer network 108. The computing resource service provider 106 comprises one or more server computer systems that host a virtual machine 112 for the user 104. The computing resource service provider 106 configures the virtual machines by allocating computing resources from the server computer systems to the virtual machines and installing one or more applications from application store 110 onto the virtual machines. The application store 110 stores the applications in the form of installation files that are run on a virtual machine to install the application, or in the form of an executable image that can be transferred to virtual storage resources on a virtual machine. The virtual machine 112 hosts a word processing application 114, a solid modeling application 116, and a video editing application 118. The applications generate display information that is encoded into display streams by a streaming agent 120 running on the virtual machine 112. The display streams are streamed to the client computer system 102 via the computer network 108. The client computer system 102 receives the display streams using an application streaming client such as a web browser configured with application streaming software, or a standalone streaming application. The application streaming client decodes the display stream and displays the application user interface on a display screen connected to the client computer system 102.

The user 104 initiates the application-streaming process by accessing an application broker interface on the client computer system 102. The application broker interface displays a list of applications available to the user in the form of menu, as icons on a desktop, as tiles on a home screen, or other application wanting interface. In some examples, the application broker interface is provided via command line. The application broker interface populates the list of available applications by accessing an application broker service running on the computing resource service provider 106. The application broker service maintains a database that specifies a set of applications available for use by the user. The database is populated by an administrator of the computing resource service.

As a result of the user launching the application streaming client, the computing resource service provider 106 launches the virtual machine 112 with computing resources that are adapted to running the set of applications to which the user 104 has been granted access. The applications to which the user 104 has been granted access are installed on the virtual machine 112 from the application store 110, and a display stream is established between the virtual machine and the client computer system 102, providing the user 104 with the user interface to the applications hosted on the virtual machine 112. The user 104 can execute one or more of the installed applications, which share the computing resources on the virtual machine 112.

In another implementation, when the user launches the application streaming client, the computing resource service provider 106 does not launch a virtual machine until or unless the user 104 selects an application to run. The application streaming client running on the client computer system 102 generates a desktop interface and presents it to the user 104. The applications for which the user 104 is authorized may be launched from the desktop interface via icons, a menu, or other user interface elements. Selecting an application from the desktop interface sends a command to the computing resource service provider 106 that launches a virtual machine that is configured with computing resources adapted to executing the selected application. If an additional application is selected from the desktop interface, the computing resource service provider 106 launches an additional virtual machine with computing resources adapted to execute the additional application. If an application is closed, the corresponding virtual machine and associated computing resources are released. Each virtual machine contains a streaming agent that encodes display information provided by the application running on the virtual machine. The client computer system 102 receives a display stream from each virtual machine. The display streams are received and combined by a stream combiner component within the application streaming client, and are presented on a unified desktop interface.

Figure 2:
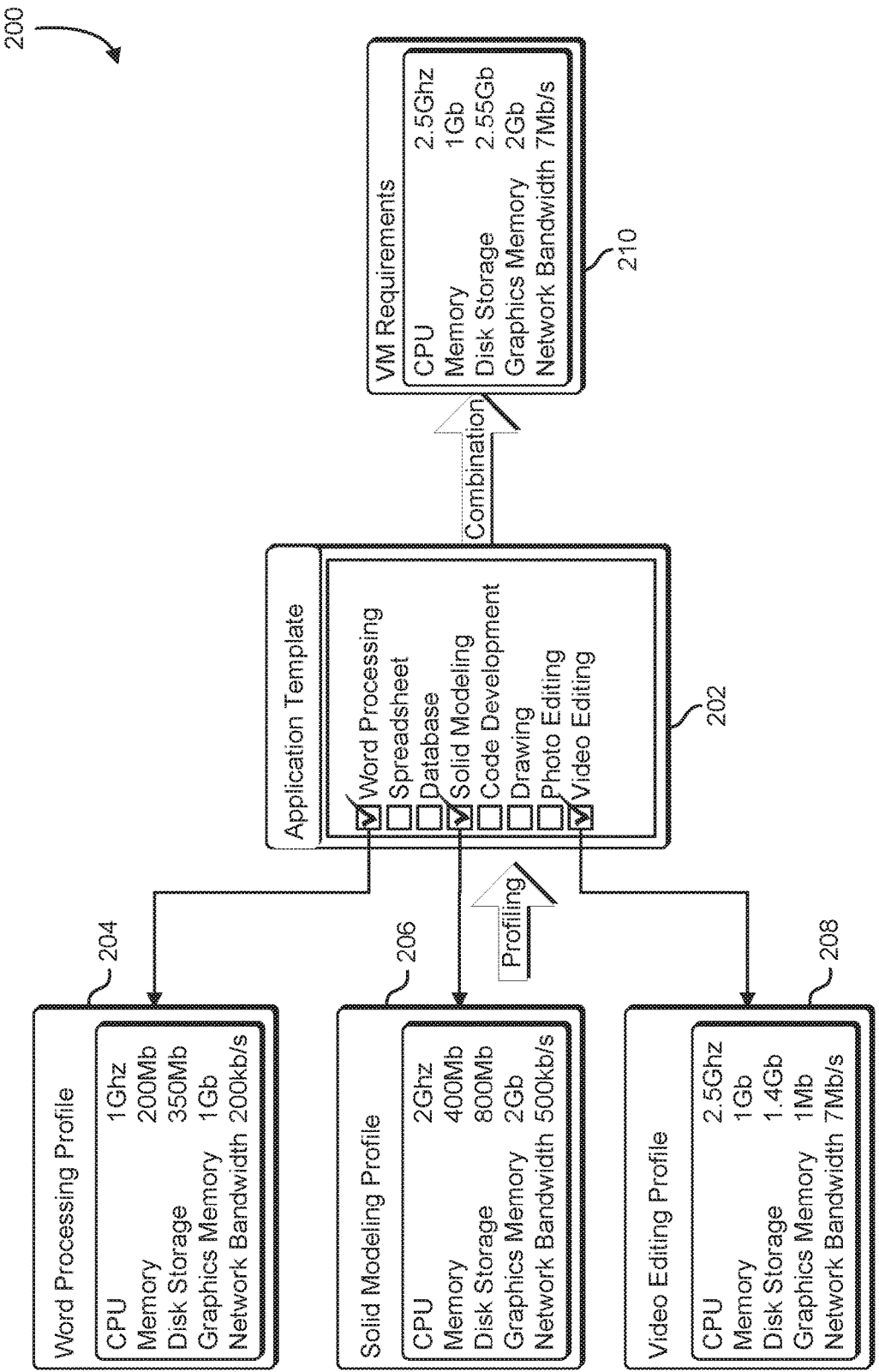
FIG. 2 shows an illustrative example of a process that, as a result of being performed, determines computing resource requirements for a client based at least in part on a set of selected application programs, in accordance with an embodiment.

FIG. 2 shows an illustrative example of a process that, as a result of being performed, determines computing resource requirements for a client based at least in part on a set of selected application programs, in accordance with an embodiment. A process diagram 200 shows information maintained by the computing resource service provider that allows the computing resource service provider to configure virtual machines which are adapted to the particular set of applications made available to the user. Computer applications are associated with a set of computing resource requirements. The resource requirements describe minimum and recommended amounts of various computing resource types such as persistent storage, memory, processing capabilities, network bandwidth, graphics memory, graphics capability, peripheral requirements, requirements for supporting software, or other requirements. Processing capabilities may be specified as a minimum and recommended clock speed, or a combination of clock speed and processor type. In some examples, processing capabilities may be specified in generic terms such as operations per second, floating-point operations per second, or an operation execution rate. Graphics capabilities may be part of application requirements and may specify a minimum amount of graphics memory and/or a minimum speed or type of graphics processor. Some applications may require certain peripherals or interfaces to be present, and some applications require particular supporting software be installed with the application such as a particular type of operating system having a minimum version number. Application requirements may be satisfied using a virtual machine by configuring the virtual machine with virtual resource equivalents that correspond to the computing resource requirements of the application.

An application template 202 specifies a set of applications that are to be made available to the user by a computing resource service provider. The computing resource service provider can acquire the application template 202 from the user or from an administrator responsible for providing computing services to the user. In some embodiments, the application template 202 is acquired by analyzing information collected by a monitoring agent that executes on the user's client computer system. The monitoring agent records application use patterns, and identifies the set of applications that are used, as well as recording combinations of applications which are used simultaneously. The application template 202 is linked to three selected application profiles. A word processing profile 204 describes a set of requirements for executing a corresponding word processing application on a host computer system. A solid modeling profile 206 describes a set of requirements for executing a corresponding solid modeling application and a host computer system. A video editing profile 208 describes a set of requirements for executing a corresponding video editing application on a computer system. The three application profiles each specify a minimum CPU speed, a minimum amount of memory, a minimum amount of disk storage, a minimum amount of graphics memory, and a minimum amount of available network bandwidth.

The computing resource service provider combines the profiles of the applications selected in the application template 202 to generate a set of virtual machine requirements 210. If applications are anticipated to be run one at a time, the requirements can be combined by identifying the maximum of the minimum CPU, memory, graphics memory, and network bandwidth limitations. Since disk storage requirements generally apply even when the application is not running, the disk storage requirements for each application are added to determine the disk storage requirements for the set of virtual machine requirements 210. If applications are anticipated to be run simultaneously, the virtual machine requirements 210 are determined by adding the requirements of the applications to be run simultaneously. For example, in the example of FIG. 2, if the word processing application and the solid modeling application are to be run simultaneously, the virtual machine requirements would be 3 GHz CPU, 600 MB memory, 1.15 GB disk storage, 700 kB network bandwidth, and 3 GB graphics memory.

In some examples, the computing resource requirements of an application represent a maximum transient resource use rather than a consistent usage, and therefore less than the sum of the stated resource requirements may be necessary for simultaneous application execution. For a set of applications to be run simultaneously, various items of the virtual machine requirements 210 can be determined by identifying the maximum of the minimum required resources for each resource type for each application, and adding a fraction of the difference between the identified maximum and the sum of all application resources. For example, in FIG. 2, for the three selected applications to be run simultaneously, the virtual machine requirements 210 for memory can be determined by identifying the maximum amount of memory required by the three applications (1 GB), and adding a fraction (half in this example) of the remaining application's requirements (400 MB+200 MB) to arrive at a virtual machine memory requirement of 1.3 GB (1 GB+(0.5×(400 MB+200 MB))=1.3 GB). The fraction can be adjusted based at least in part on the variability of actual computing resource usage by the applications.

Figure 3:
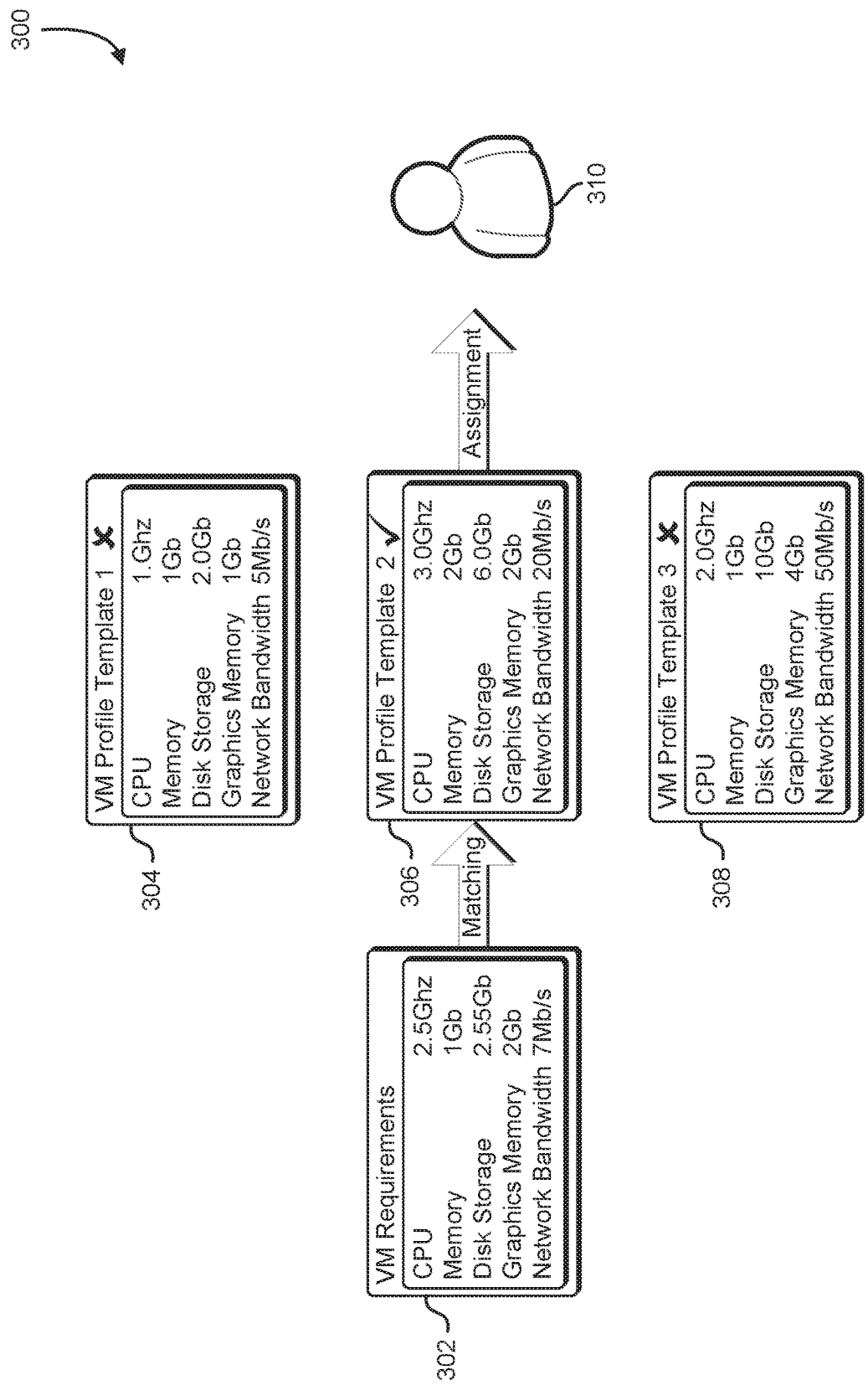
FIG. 3 shows an illustrative example of a process that, as a result of being performed, assigns a type of virtual instance to a user, in accordance with an embodiment.

FIG. 3 shows an illustrative example of a process that, as a result of being performed, assigns a type of virtual instance to a user, in accordance with an embodiment. A process diagram 300 shows how virtual machine requirements 302 can be used by the computing resource service provider to identify an appropriate virtual machine profile template for configuring a virtual machine. In some implementations, a computing resource service provider provides virtual machines to clients using a number of predefined virtual machine profile templates. The virtual machine profile templates specify a configuration of computing resources that acts as a template for provisioning virtual machine. By providing a number of predefined virtual machine configurations, the computing resource service provider can, in some embodiments, generate and maintain a pool of virtual machines in advance of any client requests. As a result, when a request to execute an application is received by the computing resource service provider, a virtual machine can be provisioned from the existing pool of virtual machines, and applications may be installed and launched more quickly.

In the example shown in FIG. 3, the virtual machine profile template is selected by identifying a virtual machine profile template that meets or exceeds the virtual machine requirements 302. Three virtual machine profile templates are supported by the computing resource service provider. A first VM profile template 304 is unsuitable because the amount of processing power, disk storage, graphics memory, and network bandwidth is less than the minimum amount specified in the virtual machine requirements 302. A second VM profile template 306 is suitable because the amount of each type of computing resource in the profile meets or exceeds the minimum amount specified in the virtual machine requirements 302. A third VM profile template 308 is unsuitable because the amount of processing power is less than the minimum amount specified in the virtual machine requirements 302. If more than one VM profile template satisfies the virtual machine requirements 302, the computing resource service provider uses a number of criteria to select from the satisfactory VM profile templates. In some examples, the computing resource service provider selects a particular VM profile template from a set of satisfactory VM profile templates based at least in part on a metric that is substantially proportional to the cost of operating a virtual machine in accordance with each VM profile template. The metric is applied to each computing resource type specified in the VM profile templates, and each VM profile template is analyzed to determine an overall metric for the VM profile. For example, the following metrics may be applied to various types of computing resources:

| | |
|---|---|
| CPU | 50/Ghz |
| Memory | 0.2/Mb |
| Disk Storage | 0.5/GB |
| Graphics Memory | 100/GB |
| Network Bandwidth | 0.1/MB |

Applying the above metrics produces the following overall metrics for the VM profile templates shown in FIG. 3.

| Resource | Rate | VM Profile 1 | Resource Metric |
|---|---|---|---|
| CPU | 50/Ghz | 1 Ghz | 50 |
| Memory | 0.2/Mb | 1 GB | 200 |
| Disk Storage | 0.5/GB | 2 GB | 1 |
| Graphics Memory | 100/GB | 1 GB | 100 |
| Network Bandwidth | 0.1/MB | 5 MB/s | 0.5 |
| | | Total Metric = | 351.5 |

| Resource | Rate | VM Profile 2 | Resource Metric |
|---|---|---|---|
| CPU | 50/Ghz | 3 Ghz | 150 |
| Memory | 0.2/Mb | 2 GB | 400 |
| Disk Storage | 0.5/GB | 6 GB | 3 |
| Graphics Memory | 100/GB | 2 GB | 200 |
| Network Bandwidth | 0.1/MB | 20 MB/s | 2 |
| | | Total Metric = | 755 |

| Resource | Rate | VM Profile 3 | Resource Metric |
|---|---|---|---|
| CPU | 50/Ghz | 2 Ghz | 100 |
| Memory | 0.2/Mb | 1 GB | 200 |
| Disk Storage | 0.5/GB | 10 GB | 5 |
| Graphics Memory | 100/GB | 4 GB | 400 |
| Network Bandwidth | 0.1/MB | 50 MB/s | 5 |
| | | Total Metric = | 710 |

The total metric determined for each VM profile allows the various VM profiles to be compared to each other for the purposes of selecting a particular VM profile from a plurality of satisfactory VM profiles (VM profiles that meet or exceed the desired requirements). In the example shown above, the first VM profile template 304 is preferred, provided it meets the minimum requirements. The second VM profile template 306 is preferred next, followed by the third VM profile template 308.

In certain implementations, the availability of preconfigured virtual machines can influence or override the selection of a particular VM profile template. When the computing resource service provider provisions virtual machines from a pre-existing pool of virtual machines, the presence or absence of virtual machines in the pool having a particular VM profile template may be used to select a particular VM profile template for new client request. For example, if a number of VM profile templates meet or exceed the virtual machine requirements 302, but only one of the number of VM profile templates has a corresponding virtual machine in a pool of available VM's, the computing resource service provider will allocate the existing virtual machine from the pool rather than create a new virtual machine.

In some embodiments, the computing resource service provider generates a virtual machine based at least in part directly on the virtual machine requirements 302, and does not rely on a finite set of VM profile templates. A VM profile template may be created that matches the virtual machine requirements 302, or a virtual machine may be generated directly from the virtual machine requirements 302. Once the VM has been acquired by the computing resource service provider, the VM is assigned to a user 310. When combined with the process of FIG. 2, the user 310 is provided with a virtual machine that is adapted to hosting the particular applications used by the user.

Figure 4:
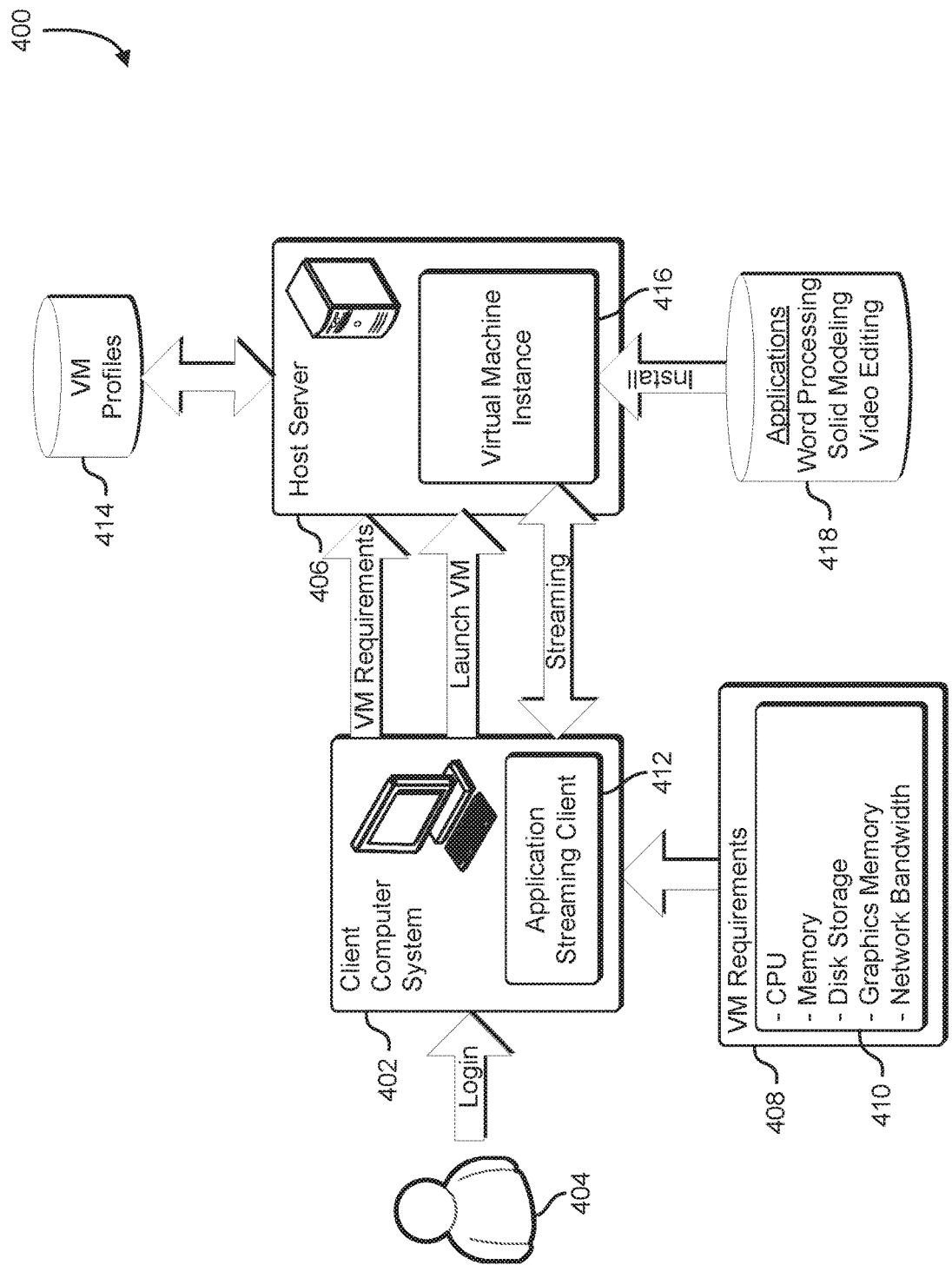
FIG. 4 shows an illustrative example of a client-server computer system that provides computing resources to a client that are adapted to host a specified set of applications, in accordance with an embodiment.

FIG. 4 shows an illustrative example of a client-server computer system that provides computing resources to a client that are adapted to host a specified set of applications, in accordance with an embodiment. A system diagram 400 includes a client computer system 402 that is used by a user 404 to access computing resources provided by a host server 406. A set of virtual machine requirements 408 is determined based at least in part on an identified set of applications used by the user 404. The set of virtual machine requirements 408 include specifications 410 that identify various amounts and characteristics of particular computing resources. An application streaming client runs on the client computer system 402. The application streaming client is an application program that interfaces with the host server 406 to acquire computing resources in the form of access to one or more virtual machines hosted by the host server 406. The application streaming client 412 processes outgoing interface data such as keystrokes, mouse movements, 3-D mouse movements and positions, and mouse clicks performed by the user 404 and transmits the interface data to the host server 406. Virtual machines running on the host server 406 execute applications requested by the user 404, and display information produced by the applications is encoded and streamed to the application streaming client 412. The application streaming client 412 decodes the received streamed display information and presents an operational user interface to the user 404 that allows the user to interact with the applications running on the virtual machines.

In some examples, the host server 406 provides a single virtual machine to the user 404 based at least in part on a single combined set of VM requirements that are sufficient to host the applications used by the user. The user 404 launches the application streaming client 412. The application streaming client 412 presents the user 404 with a display that allows the user to request execution of an application. The application streaming client 412 provides the virtual machine requirements 408 to a computing resource service provider running on the host server 406. In some implementations, the computing resource service provider accesses a database of VM templates 414. The database of VM templates 414 retains a number of VM profile templates supported by the computing resource service provider. The computing resource service provider compares the provided virtual machine requirements 408 to the VM profile templates retained on the database of VM templates 414, and selects a particular VM profile for satisfying the user's request. The computing resource service provider launches a virtual machine instance 416 in accordance with the selected VM profile. In another implementation, the computing resource service provider generates the virtual machine instance 416 directly from the virtual machine requirements 408.

One or more applications are generally installed onto the virtual machine instance 416 by the computing resource service provider from an application store 418. Applications may be installed onto the virtual machine instance 416 by executing an installation program or installer provided by the application's manufacturer, or by copying a preinstalled disk image of the application onto the virtual machine instance 416. In some implementations, applications are provided to the virtual machine instance 416 by allowing the virtual machine instance 416 to execute a remote copy of the application outside the virtual machine instance 416. Applications may be installed on demand, as a result of the user 404 request the execution of the specific application.

A streaming agent on the virtual machine instance 416 captures the display information generated by the application running on the virtual machine instance 416, encodes the display information into a display stream that is transmitted to the application streaming client 412 on the client computer system 402. The application streaming client 412 decodes the display information and presents a user interface to the user 404 that allows the user to interact with the application. In some implementations, the computing resource service provider provides more than one virtual machine instance to the user 404. For example, in some embodiments a virtual machine instance is created for each application available to the user 404. A streaming agent running on each virtual machine provides a display stream to the application streaming client 412. The application streaming client 412 combines the display streams and presents the user 404 with a single user interface.

The streaming agent is able to adapt the encoding algorithms used to encode the display information based on the available network bandwidth and performance. When additional bandwidth is available, the streaming agent increases the resolution of the encoded display information, resulting in a higher bitrate for the encoded display stream. If network bandwidth becomes constrained, the streaming agent can reduce the rate of the encoded display screen by reducing the resolution of the encoded display information or reducing the frame rate of the encoded display information. In some implementations, the streaming agent adapts the encoding algorithm based at least in part on the application whose display as being encoded. For example, a word processing application may be encoded with a higher resolution and a lower frame rate, whereas a videogame may be encoded with a lower resolution and a higher frame rate to preserve smooth motion. Adjustments to the encoding algorithm may be made by the streaming agent or by the streaming client running on the client computer system. Adjustments to the encoding algorithms may include adjustments to the audio encoding associated with the video display information. For example, audio encoding may be adjusted to select between stereo audio and mono audio, as well as between voice quality, radio quality, and CD-quality audio. Audio encoding may be based at least in part on audio playback facilities available to the client computer system 402.

Figure 5:
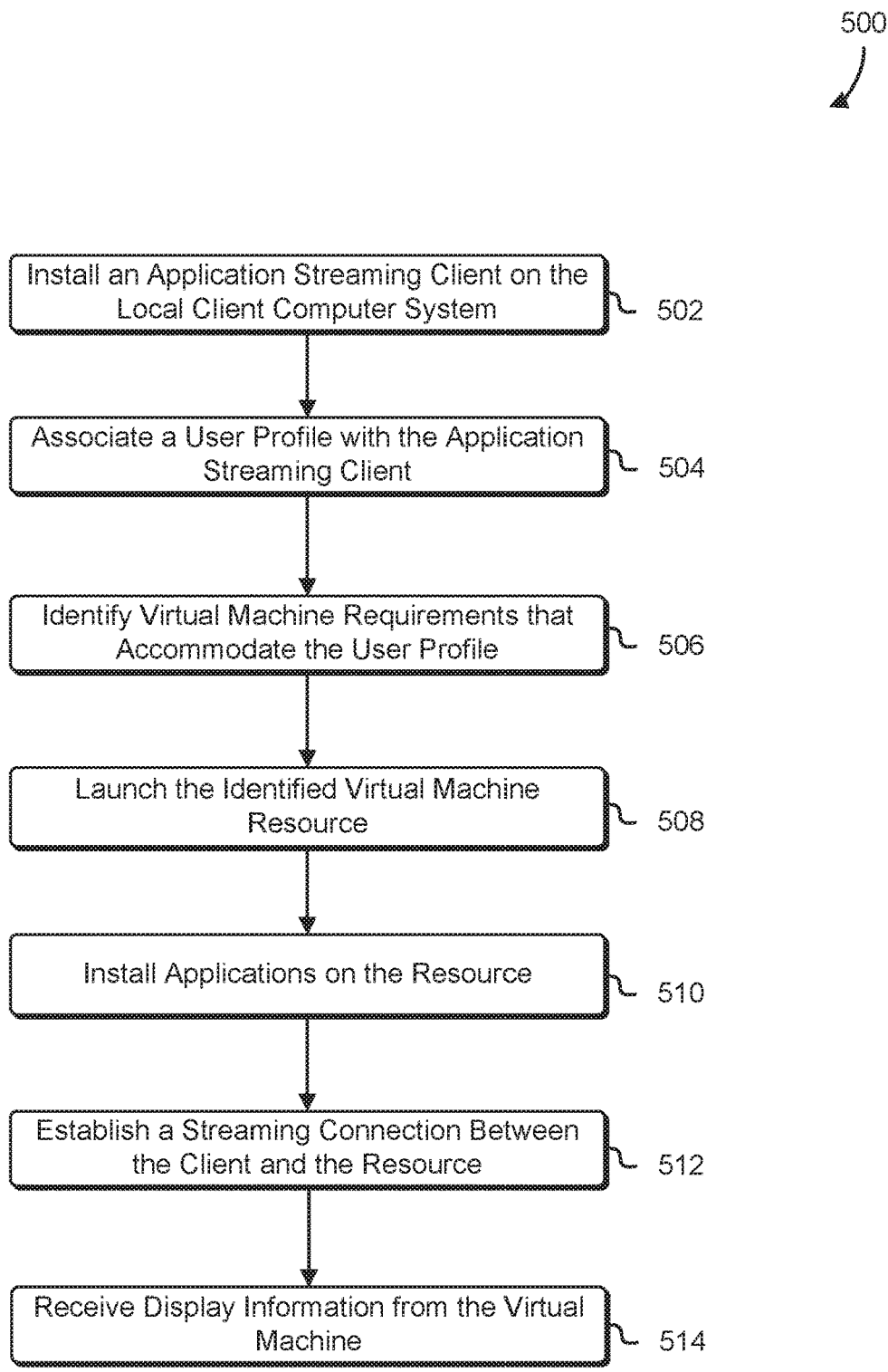
FIG. 5 shows an illustrative example of a process that, as a result of being performed by a client computer system, provisions computing resources from a server, and receives display streams from applications running on the server, in accordance with an embodiment.

FIG. 5 shows an illustrative example of a process that, as a result of being performed by a client computer system, provisions computing resources from a server, and receives display streams from applications running on the server, in accordance with an embodiment. A process diagram 500 begins at block 502 with a user installing an application streaming client on a local client computer system. In some examples, the application streaming client is a web browser, or a web browser configured with plug-ins that provide application-streaming functionality. In another example, the application streaming client is a standalone application installed on the client computer system. At block 504, the user logs into the application streaming client which authenticates the user with a service that acts as a computing resource service provider. A user profile is provided to the application streaming client that identifies applications used by the user. In some examples, the user profile includes information that describes usage patterns of the identified applications, such as identifying applications that are used simultaneously. Using the information contained within the user profile, the client computer system determines 506 a set of virtual machine requirements that accommodate the application usage described in the user profile.

At block 508, the client computer system launches a virtual machine in accordance with the determined virtual machine requirements. In some examples, the client computer system requests the virtual machine be created by a computing resource service provider. The computing resource service provider may create a virtual machine that matches the provided virtual machine requirements. In other examples, the computing resource service provider creates a virtual machine from one of a number of machine profiles that meets or exceeds the determined virtual machine requirements. In yet another example, the computing resource service provider selects a virtual machine from a pool of previously created virtual machines that are available for use. At block 510, the client computer system installs applications on the provided virtual machine. Applications may be installed on the provided virtual machine by the client or the computing resource service provider at the request of the client.

The client computer system establishes 512 a screening connection to the provided virtual machine via a streaming agent. The streaming agent is installed on the provided virtual machine and encodes display information from the installed applications, and transmits the resulting display stream to the client computer system for display to the user. The client computer system receives 514 the encoded display information, and displays the display information to the user. User input from the user such as keystrokes, mouse movements, 3-D mouse movements and orientations, and mouse clicks, is encoded by the application streaming client and transmitted to the streaming agent. In addition to video display information, additional signals can be encoded and streamed by the streaming agent to the application streaming client. In some examples, audio information produced by the operating system and applications is encoded and sent to the application streaming client.

Figure 6:
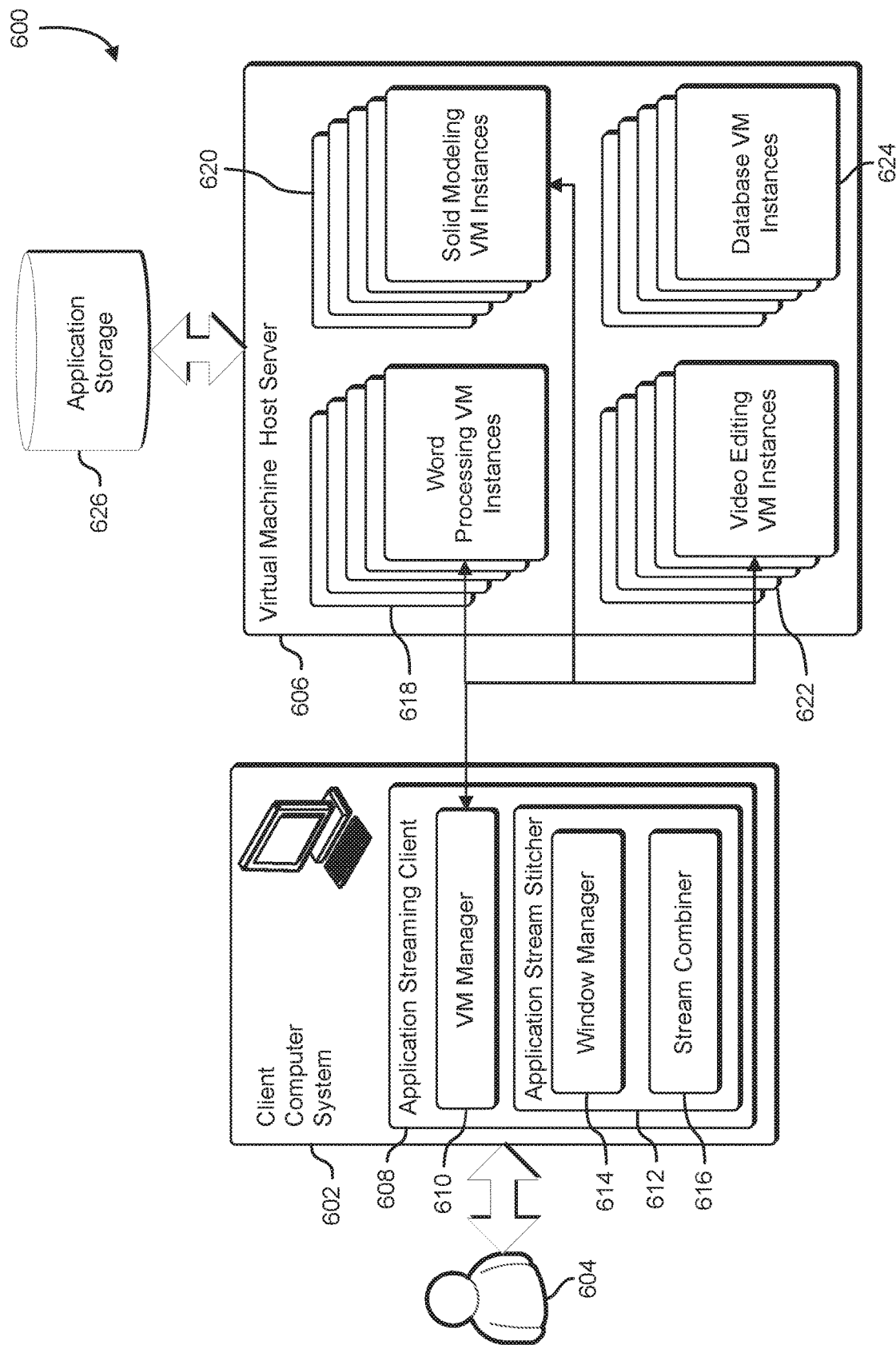
FIG. 6 shows an illustrative example of a client-server computer system that provides computing resources to a client in the form of a number of virtual machines, and each virtual machine is adapted to host a particular application specified by the client, in accordance with an embodiment.

FIG. 6 shows an illustrative example of a client-server computer system that provides computing resources to a client in the form of a number of virtual machines, and each virtual machine is adapted to host a particular application specified by the client, in accordance with an embodiment. A computing environment 600 includes a client computer system 602 operated by user 604. The client computer system 602 communicates with the virtual machine host server 606 which provides access to a number of virtual machines. The client computer system 602 includes an application streaming client 608. The application streaming client 608 includes a VM manager 610 and an application stream stitcher 612. The VM manager 610 interfaces with a computing resource service provider on the virtual machine host server 606. The VM manager 610 receives requests for computing resources from the user 604, and translates those requests into requests for virtual machines from the virtual machine host server 606. When the user 604 closes an application, the VM manager 610 notifies the virtual machine host server 606 that the virtual machine is no longer in use. In some examples, the virtual machine host server 606 decommissions the virtual machine and frees the resources allocated to the virtual machine. In another example, the virtual machine host server 606 places the decommissioned virtual machine into a pool of virtual machines available for reuse. In some embodiments, the computing resource service provider generates a number of virtual machines before they are requested by a client computer system, and places the virtual machines in the pool of available virtual machines. If the pool of available virtual machines consumes resources in excess of a predetermined amount, or if the virtual machine host server 606 runs short on resources to allocate two additional virtual machines, virtual machines within the pool of virtual machines may be recycled, and the corresponding computing resources recovered.

The application stream stitcher 612 includes a window manager 614 and a stream combiner 616. The stream combiner 616 receives display streams from the virtual machines allocated to the user 604 by the virtual machine host server 606. The stream combiner 616 decodes the information in the display streams, and generates a single display screen that can be viewed and interacted with by the user 604. The window manager 614 assists the user 604 and manages the combined display screen. The window manager 614 allows the user 604 to select display streams for viewing, view multiple display streams on a single screen, arrange and position user interface windows for displaying display streams, and minimize and maximize windows associated with display streams. The window manager 614 can provide information to the streaming agents on the virtual machines that allows the streaming agents to optimize information provided in the display stream. For example, the window manager 614 can provide a signal to the streaming agent that indicates when the corresponding display information is not visible to the user 604 (such as when the corresponding window is behind another window or minimized). In some implementations, the window manager 614 can indicate when a portion of the corresponding display information is not visible, or is hidden by another element of the display screen.

The virtual machine host server 606 may be comprised of a single physical server or a group of servers which are configured to provide a number of virtual machines. The virtual machine host server 606 hosts virtual machines that are adapted to particular applications and that run the particular application to which they are adapted. The virtual machine host server 606 hosts a set of word processing VM instances 618, a set of solid modeling VM instances 620, a set of video editing VM instances 622, and a set of database VM instances 624. Applications are installed by the virtual machine host server 606 onto newly created virtual machines from application storage 626. The applications may be maintained in the form of executable installation programs or in the form of image files that can be used to quickly configure a virtual machine for hosting the application. The client computer system 602 is provided with a VM instance for each running application. For example, in FIG. 6, the client computer system 602 is provided with a word processing VM instance, a solid modeling VM instance, and a video editing VM instance. The display streams generated from the applications running on the three VM instances are provided to the application stream stitcher 612 which combines the display information from the three applications into a single display screen that is presented to the user 604.

Figure 7:
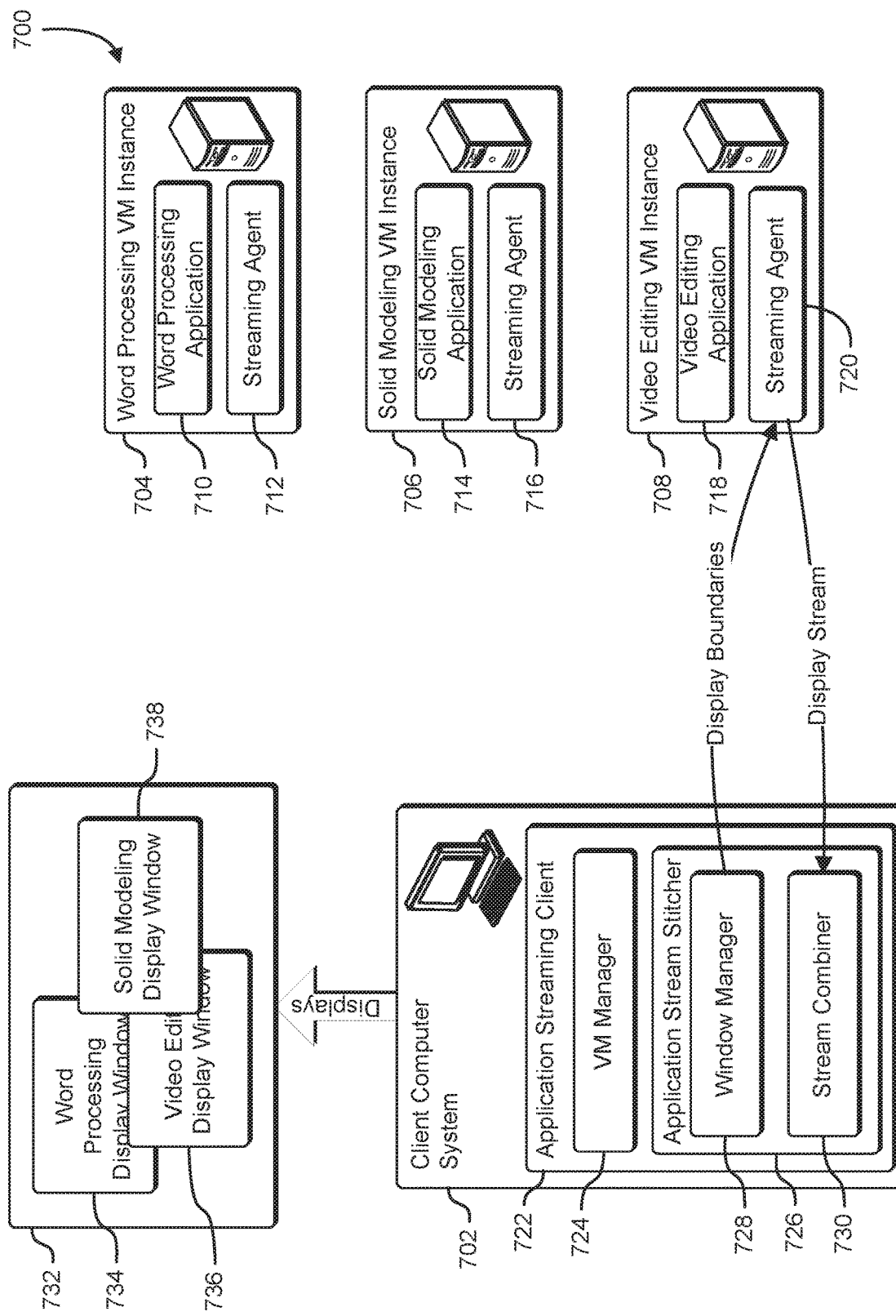
FIG. 7 shows an illustrative example of a client-server computer system that receives a number of display streams from a number of computing resources, and combines the display streams into a unified screen on a client display, in accordance with an embodiment.

FIG. 7 shows an illustrative example of a client-server computer system that receives a number of display streams from a number of computing resources, and combines the display streams into a unified screen on a client display, in accordance with an embodiment. A computing environment 700 includes a client computer system 702 that is in communication with three virtual machines provided by a computing resource service provider. The virtual machines including word processing VM instance 704, a solid modeling VM instance 706, and a video editing VM instance 708. The word processing VM instance 704 hosts a word processing application 710 and a streaming agent 712 that encodes display information and other output from the word processing application 710 and transmits a stream to the client computer system 702. The solid modeling VM instance 706 hosts a solid modeling application 714 and a streaming agent 716 which encodes and transmits display information to the client computer system 702. The video editing VM instance 708 hosts a video editing application 718 and a streaming agent 720, which encodes and streams display information from the video editing application 718 to the client computer system 702.

The client computer system 702 runs an application streaming client 722 which may be a standalone application or may be based on a web browser. The application streaming client 722 includes a virtual machine manager 724 and an application stream stitcher 726. The application stream stitcher 726 includes a window manager 728 and a stream combiner 730. The stream combiner 730 receives the display streams from the streaming agents 712, 716, and 720 and decodes the display streams to produce a combined user interface. The combined user interface includes display a word processing display window 734, a video editing display window 736, and a solid modeling display window 738. The combined user interface is displayed on a display screen 732 connected to the client computer system 702. The window manager 728 interfaces with a stream combiner 730 to identify display information that is hidden, minimized, or obscured due to combination with other streams or manipulation by the user of the client computer system 702. The window manager 728 provides the streaming agents 712, 716, and 720 with display boundary information describing the obscured regions of the corresponding display information. Using this information, the streaming agents are able to avoid encoding and transmitting information to the client computer system 702 that is not currently visible.

In some examples, display information generated by the streaming agents is consolidated on the computing resource service provider using a server-side application stream stitcher. The server-side application stream stitcher consolidates display information and transmits the consolidated display information to the application streaming client 722 on the client computer system 702. The server-side application stream stitcher sends viewport information to the streaming agents that identifies regions of the display information that are obscured or hidden as a result of the consolidation process. The streaming agents use the viewport information to avoid encoding of display data for display areas that are not visible, and also to avoid providing display information for the non-visible display areas.

Figure 8:
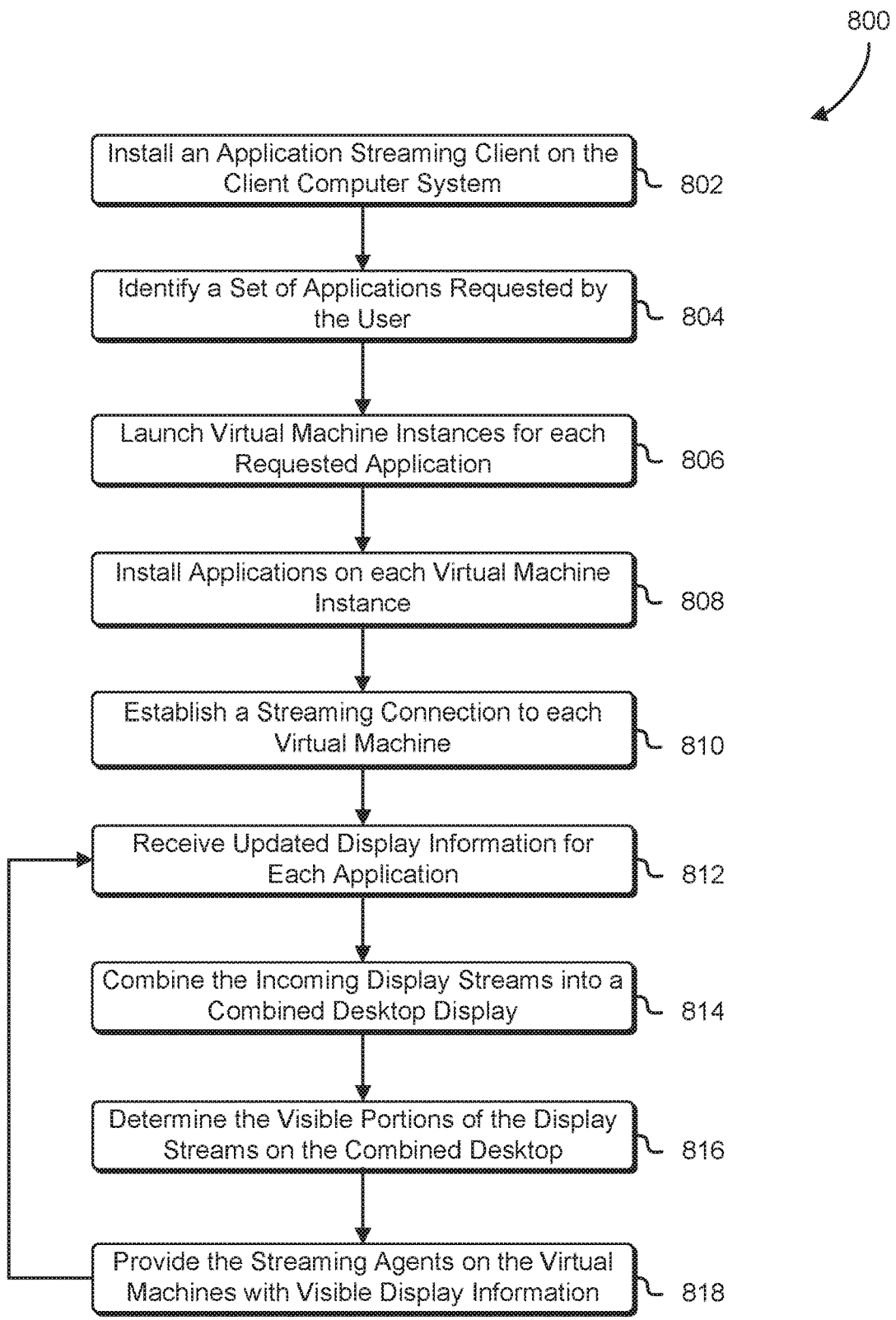
FIG. 8 shows an illustrative example of a process that, as a result of being performed by a client computer system, provisions a set of virtual machines from a server, and combines streams of display information from the virtual machines into a unified display screen, in accordance with an embodiment.

FIG. 8 shows an illustrative example of a process that, as a result of being performed by a client computer system, provisions a set of virtual machines from a server, and combines streams of display information from the virtual machines into a unified display screen, in accordance with an embodiment. A process diagram 800 begins with the installation of an application streaming client on a client computer system. The application streaming client presents a user of the client computer system with the menu, icons, or other interface that allows the user to select one or more applications. At block 804, the user selects one or more applications, and the application streaming client communicates the selection to a computing resource service provider. A virtual machine is launched 806 for each application by the computing resource service provider, and the virtual machines are configured with computing resources adapted to host the application hosted by each virtual machine. The computing resource service provider installs 808 the applications on their corresponding virtual machines, and also installs the streaming agent to provide the client computer system with display information from the application hosted by the virtual machines.

The client computer system establishes 810 a streaming connection to each streaming agent. Viewport information may be provided by the client computer system which aids the streaming agents in encoding and transmitting information to the client computer system. The client computer system receives 812 updated display information from each application via the streaming agent. The updated display information is combined 814 by a stream combiner within the application streaming agent into a single display screen. A window manager component within the application streaming client identifies 816 areas of the display information that is secured, hidden, or minimized as a result of combining the updated display information into a single display screen. The identified areas are characterized into a set of display viewport information which is provided 818 to the streaming agents on the virtual machines. The streaming agents may use this information to avoid encoding and transmitting information that is not visible on the display screen.

Figure 9:
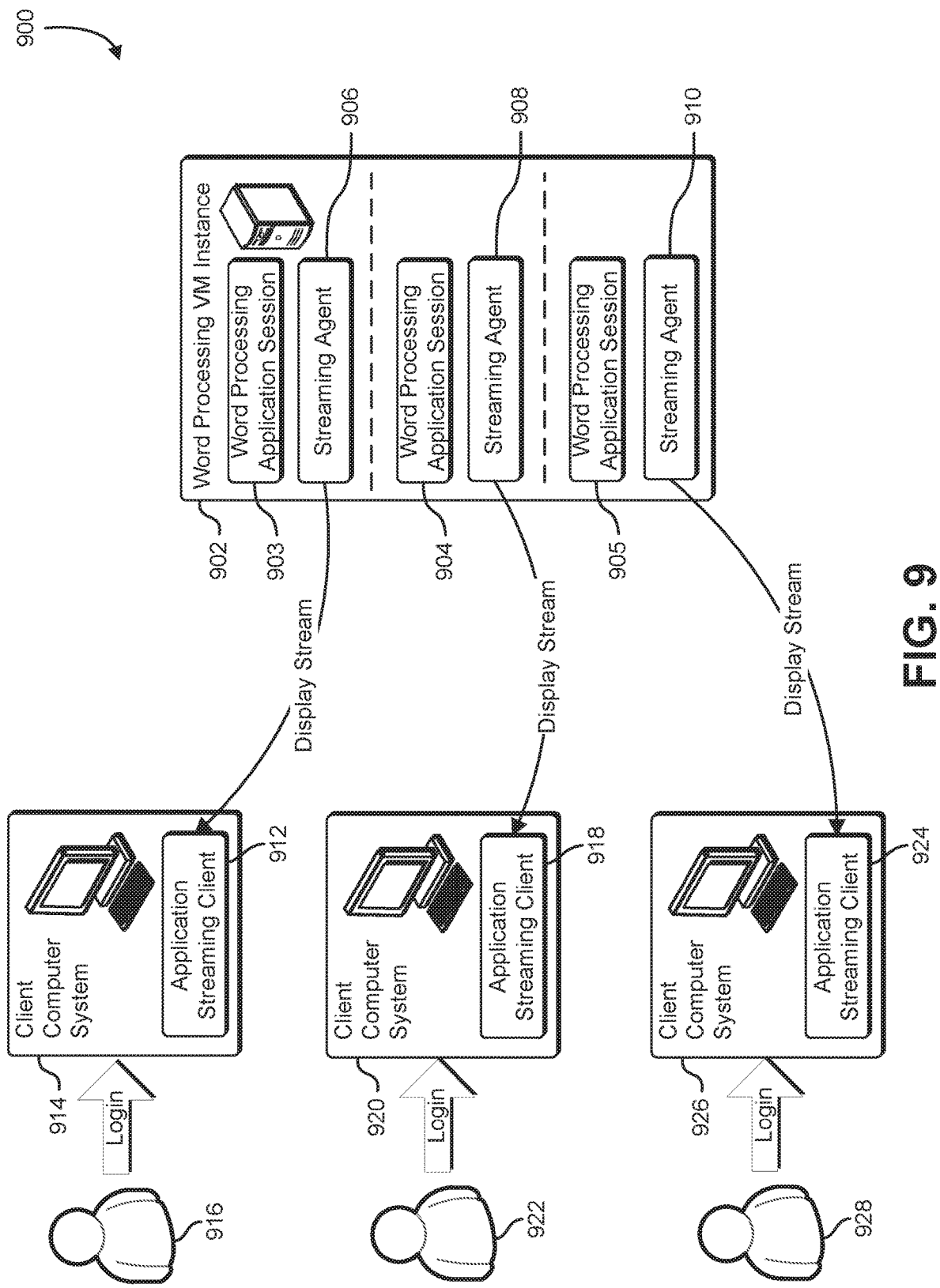
FIG. 9 shows an illustrative example of a client-server computer system that provides computing resources to a number of clients by providing a virtual machine that hosts a single application that supports multiple sessions, in accordance with an embodiment.

FIG. 9 shows an illustrative example of a client-server computer system that provides computing resources to a number of clients by providing a virtual machine that hosts a single application that supports multiple sessions, in accordance with an embodiment. An environment 900 includes a word processing VM instance 902 that is hosted by a computing resource service provider on a host computer system. The word processing VM instance 902 hosts a number of word processing application sessions 903, 904, and 905. The word processing application sessions 903, 904, and 905 execute on the same VM instance 902. Each word processing application session has an associated streaming agent to provide display information associated with the session. In FIG. 9, the word processing VM instance 902 hosts a first streaming agent 906, second streaming agent 908, and a third streaming agent 910. The first streaming agent 906 provides a display stream to a first application streaming client 912 hosted by a first client computer system 914 operated by a first user 916. The second streaming agent 908 provides a display stream to a second application streaming client 918 hosted by a second client computer system 920 operated by a second user 922. The third streaming agent 910 provides a display stream to a third application streaming client 924 hosted by a third client computer system 926 operated by a third user 928.

When the user logs into a client computer system and requests access to a word processing application via an application streaming client, the application streaming client contacts the computing resource service provider which creates a word processing application session on the word processing VM instance 902. The word processing application session causes a corresponding streaming agent to be instantiated on the word processing VM instance 902. A streaming session is created between the application streaming client and the streaming agent, and display information is provided by the word processing application for the new session corresponding to the user's word processing request. By using a single application instance, many resources can be shared across word processing sessions. For example, elements of the word processing applications user interface may be encoded by one streaming agent, and reused by the remaining agents thereby eliminating re encoding of common UI elements such as menus, ribbons, and icons.

Figure 10:
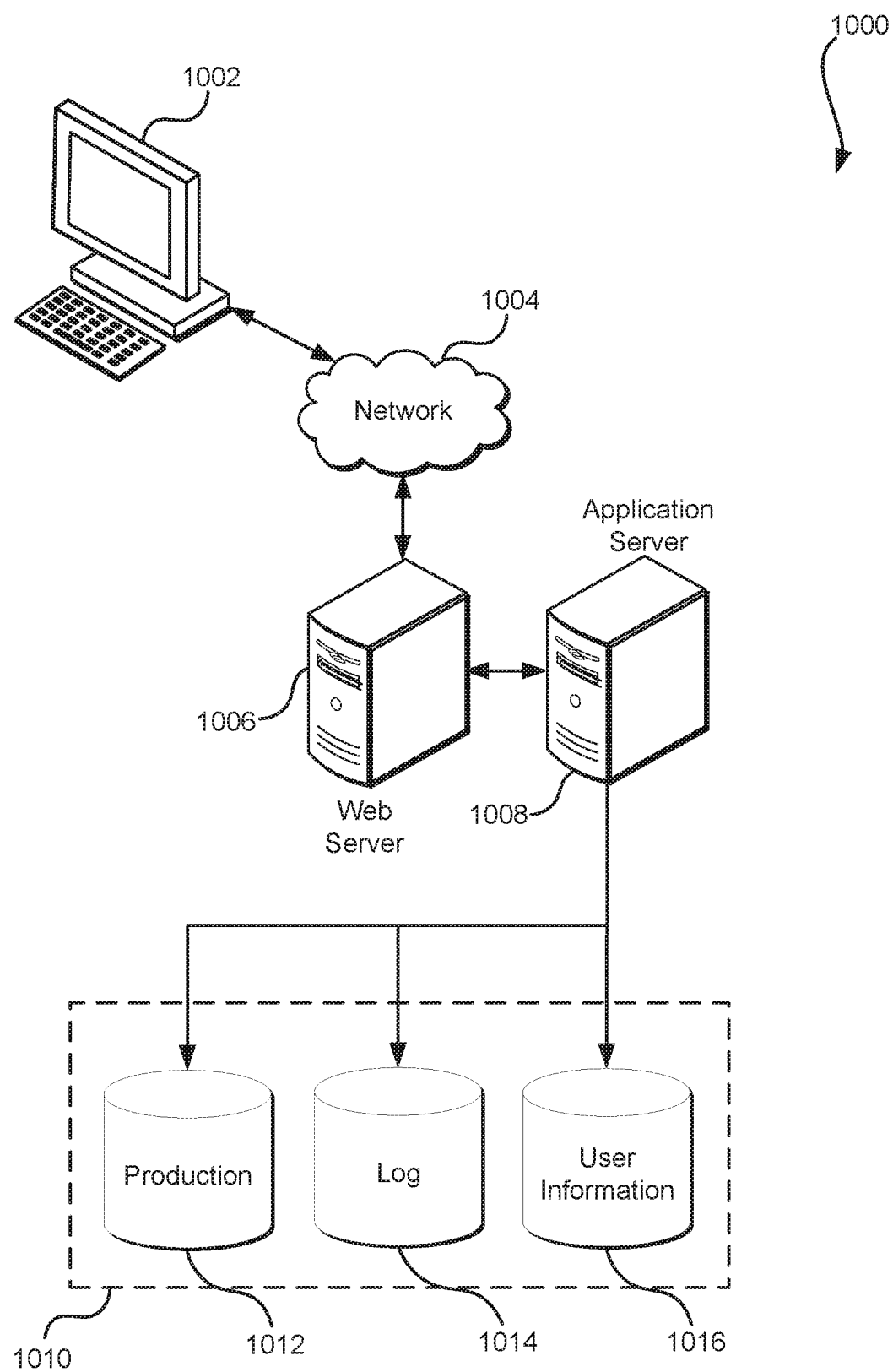
FIG. 10 illustrates an environment in which various embodiments can be implemented.

FIG. 10 illustrates aspects of an example environment 1000 for implementing aspects in accordance with various embodiments. As will be appreciated, although a web-based environment is used for purposes of explanation, different environments may be used, as appropriate, to implement various embodiments. The environment includes an electronic client device 1002, which can include any appropriate device operable to send and/or receive requests, messages, or information over an appropriate network 1004 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers or other elements, and processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual, or clustered environment.

The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of Hyper-Text Markup Language ("HTML"), Extensible Markup Language ("XML"), JavaScript, Cascading Style Sheets ("CSS"), or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1002 and the application server 1008, can be handled by the web server using PHP: Hypertext Preprocessor ("PHP"), Python, Ruby, Perl, Java, HTML, XML, or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1010 can include several separate data tables, databases, data documents, dynamic data storage schemes and/or other data storage mechanisms and media for storing data relating to a particular aspect of the present disclosure. For example, the data store illustrated may include mechanisms for storing production data 1012 and user information 1016, which can be used to serve content for the production side. The data store also is shown to include a mechanism for storing log data 1014, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. The application server 1008 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the client device 1002. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual machine utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices, or processing devices that can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python or TCL, as well as combinations thereof. The server(s) may also include database servers, including without limitation those commercially available from Oracle®, Microsoft®, Sybase and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, 3-D mouse, keyboard, controller, touch screen, or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

In the preceding and following description, various techniques are described. For purposes of explanation, specific configurations and details are set forth in order to provide a thorough understanding of possible ways of implementing the techniques. However, it will also be apparent that the techniques described in this document may be practiced in different configurations without the specific details. Furthermore, well-known features may be omitted or simplified to avoid obscuring the techniques being described.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors.

The computer-readable storage medium may be non-transitory. Further, in some examples, computer systems are configured to implement one or more services that collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A non-transitory computer-readable storage medium comprising executable instructions that, as a result of being executed by one or more processors of a computer system, cause the computer system to at least:
send, to a computing resource service provider comprising one or more additional computer systems, a request, from a client device, to use a first application, the request to use the first application causing the computing resource service provider to determine computing resource requirements of the first application and provision a first virtual machine adapted in particular to execute the first application, the first virtual machine configured based at least in part on the computing resource requirements of the first application;
receive, at the client device, a first stream of display information from the first virtual machine, wherein the first virtual machine adapts encoding of the first stream based at least in part on an application type of the first application and available network bandwidth from the first virtual machine to the client device;
send, to the computing resource service provider, a request, from the client device, to use a second application, the request to use the second application causing the computing resource service provider to provision a second virtual machine adapted in particular to execute the second application, the second virtual machine configured based at least in part on computing resource requirements of the second application, wherein the computing resource requirements of the second application are different from the computing resource requirements of the first application;
receive, at the client device, a second stream of display information from the second virtual machine, wherein the second virtual machine adapts encoding of the second stream based at least in part on an application type of the second application and available network bandwidth form the second virtual machine to the client device; and
combine, by the client device, the first stream of display information and the second stream of display information to produce a combined user interface for the first application and the second application.

2. The non-transitory computer-readable storage medium of claim 1, comprising instructions that, as a result of being executed by the one or more processors, cause the computer system to:
identify at least a portion the first stream of display information that is not visible on the combined user interface; and
send viewport information to the computing resource service provider that describes the portion of the first stream of display information.

3. The non-transitory computer-readable storage medium of claim 1, comprising instructions that, as a result of being executed by the one or more processors, cause the computer system to:
determine that network connectivity to the computing resource service provider has been lost; and
as a result of having determined that network connectivity has been lost, cause the computing resource service provider to deallocate the first virtual machine.

4. The non-transitory computer-readable storage medium of claim 1, wherein the combined user interface includes a first window that displays display information from the first virtual machine and a second window that displays display information from the second virtual machine.

5. The non-transitory computer-readable storage medium of claim 1, comprising instructions that, as a result of being executed by the one or more processors, cause the computer system to:
encode user input from one or more devices that are connected to the computer system into an input stream; and
transmit the input stream to the computing resource service provider.

6. The non-transitory computer-readable storage medium of claim 1, wherein an application stream stitcher receives and integrates the first and second streams of display information into the combined user interface.

7. The non-transitory computer-readable storage medium of claim 1, wherein:
the first stream of display information includes audio information that is produced by the first application;
the second stream of display information includes audio information that is produced by the second application; and
the combined user interface includes audio information from the first application and the second application.

8. A computer-implemented method, comprising:
receiving, by a computing resource service provider comprising one or more computer systems, one or more requests, from a client device, to use a first application and a second application;
determining, by the computing resource service provider, in response to the one or more requests, computing resource requirements of the first application;
provisioning, by the computing resource service provider, a first virtual machine adapted in particular to execute the first application based at least in part on the computing resource requirements of the first application, wherein the first virtual machine provides a first stream of display information associated with the first application, wherein the first virtual machine adapts an encoding of the first stream based at least in part on an application type of the first application and available network bandwidth from the first virtual machine to the client device;
provisioning, by the computing resource service provider, a second virtual machine adapted in particular to execute the second application based at least in part on computing resource requirements of the second application, wherein the second virtual machine provides a second stream of display information associated with the second application, wherein the computing resource requirements of the second application are different from the computing resource requirements of the first application, wherein the second virtual machine adapts an encoding of the second stream based at least in part on an application type of the second application and available network bandwidth from the second virtual machine to the client device;
consolidating, by the computing resource provider, the first and second streams of display information; and
transmitting the consolidated streams of display information.

9. The computer-implemented method of claim 8, wherein a window manager provides viewport information.

10. The computer-implemented method of claim 9, further comprising:
omitting data from at least one of the first or second streams of display information, based at least in part on the viewport information.

11. The computer-implemented method of claim 8, further comprising:
deallocating at least one of the first or second virtual machines, based at least in part on determining that network connectivity to a client has been lost.

12. The computer-implemented method of claim 8, further comprising transmitting data for a user interface comprising a first window based at least in part on the first stream of display information from the first virtual machine, and comprising a second window based at least in part on the second stream of display information from the second virtual machine.

13. The computer-implemented method of claim 8, further comprising:
receiving data indicative of user input from one or more devices connected to a client.

14. The computer-implemented method of claim 8, wherein the first stream of display information is encoded based at least in part on an application type of the first application.

15. A system, comprising:
at least one processor; and
memory comprising instructions that, in response to execution by the at least one processor, cause the system to at least:
receive, by a computing resource service provider comprising one or more computer systems, from a client, one or more requests to use a first application and a second application;
determine, by the computing resource service provider, resource requirements of the first application;
configure, by the computing resource service provider, a first virtual machine adapted in particular to execute a first application, the first virtual machine configured according to the resource requirements of the first application, wherein the configured first virtual machine sends, to the client, a first stream of display information associated with the first application, wherein the first virtual machine adapts an encoding of the first stream based at least in part on an application type of the first application and available network bandwidth from the first virtual machine to the client; and
configure, by the computing resource service provider, a second virtual machine adapted in particular to execute a second application, the second virtual machine configured according to resource requirements of the second application and the resource requirements of the second application are different from the resource requirements of the first application, wherein the second virtual machine sends, to the client, a second stream of display information associated with the second application, wherein the second virtual machine adapts an encoding of the second stream based at least in part on an application type of the second application and available network bandwidth from the second virtual machine to the client, and wherein the client combines the first and second streams of display information to generate a user interface.

16. The system of claim 15, wherein a window manager on the client provides viewport information.

17. The system of claim 16, the memory comprising instructions that, in response to execution by the at least one processor, cause the system to at least:
exclude data from a stream, the data excluded based at least in part on the viewport information.

18. The system of claim 15, the memory comprising instructions that, in response to execution by the at least one processor, cause the system to at least:
deallocate at least one of the first or second virtual machines, based at least in part on determining that network connectivity to the client has been lost.

19. The system of claim 15, wherein the user interface comprises a first window based at least in part on the first stream of display information from the first virtual machine, and comprises a second window based at least in part on the second stream of display information from the second virtual machine.

20. The system of claim 15, the memory comprising instructions that, in response to execution by the at least one processor, cause the system to at least:
receive data indicative of user input from one or more devices connected to the client.

* * * * *